United States Patent [19]

Kuo

[11] Patent Number: 5,560,260
[45] Date of Patent: Oct. 1, 1996

[54] CONNECTOR FOR ENGAGING BRAKE CABLES

[76] Inventor: Yung-pin Kuo, No. 55, Alley 121, Lane 175, Kuosheng Rd., Changhua City, Taiwan

[21] Appl. No.: 390,664

[22] Filed: Feb. 17, 1995

[51] Int. Cl.⁶ .................................................. F16C 1/10
[52] U.S. Cl. .................. 74/502.4; 74/502.6; 188/24.19; 188/24.21; 188/24.22; 188/2 D; 403/303
[58] Field of Search .................. 74/502.4, 502.6, 74/501.5 R; 188/24.19, 24.21, 2 D, 196 M, 196 V, 24.22; 403/303; 192/111 A

[56] References Cited

U.S. PATENT DOCUMENTS

| | | | |
|---|---|---|---|
| 2,160,181 | 5/1939 | Taylor | 188/24.21 X |
| 3,383,941 | 5/1968 | Nielsen et al. | 74/502.4 |
| 3,861,714 | 1/1975 | Evans et al. | 188/24.21 |
| 4,026,390 | 5/1977 | Yoshigai | 188/24.21 |
| 4,552,251 | 11/1985 | Schoch | 188/24.21 |
| 4,850,456 | 7/1989 | Chi | 188/24.19 |
| 4,877,112 | 10/1989 | Malinowski | 188/24.22 |
| 5,060,534 | 10/1991 | Yoshigai | 74/502.2 |
| 5,293,965 | 3/1994 | Nagano | 188/2 D |
| 5,368,136 | 11/1994 | Walte | 188/24.22 |
| 5,431,256 | 7/1995 | Wen | 403/303 |

FOREIGN PATENT DOCUMENTS

| | | | |
|---|---|---|---|
| 651978 | 10/1937 | Germany | 188/24.21 |
| 442567 | 2/1936 | United Kingdom | 188/24.21 |

*Primary Examiner*—Vinh T. Luong
*Attorney, Agent, or Firm*—Kirkpatrick & Lockhart LLP

[57] ABSTRACT

A connector for engaging brake cables of a bicycle, the connector has a bore defined therein, a counter-bore defined therein and in communication with the bore, and a first hole transversely defined therein which is in communication with and perpendicular to the bore through which a bolt extends. A first brake cable and a second brake cable respectively extend from the connector and connect to a corresponding brake arm thereof, a third brake cable extending to connect a brake lever at a first end thereof and passing through a second hole defined in the bolt and extending through the first hole with a second end thereof, the bolt engaged to a nut via a spring and a washer so as to securely position the third brake cable such that the third brake cable is able to be adjusted by unscrewing the bolt and the first cable and the second brake cable exerting an equal force to the corresponding brake arms thereof when the connector is pulled upwardly by the third brake cable.

5 Claims, 6 Drawing Sheets

CONNECTOR FOR ENGAGING BRAKE CABLES

BACKGROUND OF THE INVENTION

1. Field of the Invention

The present invention relates to a connector and more particularly, to a connector engaging brake cables of a bicycle.

2. Description of the Prior Art

Referring to FIGS. 1, 2 and 3, a bicycle has two brake arms 80 (only one is shown) each pivotally engaged to a corresponding front fork 90 and positioned between one of two sides of a wheel rim 92 of the bicycle. One of the brake arms 80 is connected to a first brake cable 651 as shown in FIG. 2 and the other brake arm is connected with a second brake cable 652, both the first and the second brake cables 651, 652 extend upwardly to connect to a connector 70 which is composed of a cover 74 and a base 75. The cover 74 has a first hole 72 and a second hole 73 defined therein and, a cut-out 71 is defined in a periphery of the cover 74 above and between the first and the second holes 72, 73, the base 75 has a recess 76 defined in a side thereof corresponding to the first hole 72 of the cover 74, a protrusion 77 extending from the side of the base 75 and corresponding to the second hole 73, and a first groove 78 defined transversely in the side between the protrusion 77 and the recess 76, a second groove 79 defined in the side and communicating with the first groove 78 and a cut-out 761 defined in a periphery thereof and communicating with the recess 76. When assembling the connector 70, the first brake cable 651 is received in the first groove 78 and extends to a brake lever 93 (see FIG. 3), the second brake cable 652 has a first end with a head 6521 formed thereto which is received in the recess 76 and the head 6521 extends through the first hole 72 of the cover 74 which is engaged to the base 75 by extending the protrusion 77 through the second hole 73 of the cover 74 and then deforming a head of the protrusion 77 extending out of the second hole 73 to fixedly engage the cover 74 and the base 75, wherein a second end of the second brake cable 652 is pivotally engaged to the brake arm which is not shown in figures. The second brake cable 652 extends out from the connector 70 via the cut-out 761 and the first brake cable 651 is removed from the first groove 78 to the second groove 79 and connected to the brake arm 80 when the brake arm 80 connected thereto is set.

When a rider grasps the brake lever 93, the connector 70 is pulled upwardly by the first brake cable 651 and the two brake arms 80 are pivoted to stop the wheel rim 92 by a brake block 82 connected to each of the brake arms 80 contacting the wheel rim 92. However, under such an arrangement, the brake arm 80 connected to the first brake cable 651 tends to bear a larger force from the first brake cable 651 which is directly connected to the brake lever 93 than that of the brake arm connected to the second brake cable 652 such that a position of the brake arm 80 connected to the first brake arm 651 needs to be adjusted by a technician often in order to maintain its suitable position corresponding the brake arm connected to the second brake cable 652.

The present invention intends to provide a connector which has a first and a second brake cables extending integrally therefrom and a third brake cable securely engaged thereto by a bolt and spring, the third brake cable connected to a brake lever such that when the brake lever is grasped, an equally-distributed force is provided to the first and the second brake cables to mitigate and/or obviate the above-mentioned problems.

SUMMARY OF THE INVENTION

The present invention provides a connector for engaging brake cables of a bicycle, the connector has a bore defined therein through which a bolt extends and a first hole transversely defined therein which is in communication with and perpendicular to the bore. A first brake cable and a second brake cable respectively extend from the connector and connect to a corresponding brake arm thereof, a third brake cable extending to connect a brake lever at one end thereof and passing through a second hole defined in the bolt and extending through the first hole with the other end thereof, the bolt engaged to a nut via a spring and a washer.

It is an object of the present invention to provide a connector having two brake cables extending therefrom and the two brake cables connected to a corresponding brake arm thereto and a third brake cable fixedly however adjustably engaged thereto so as to provide an equal force to the two brake cables when the third brake cable is pulled up.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
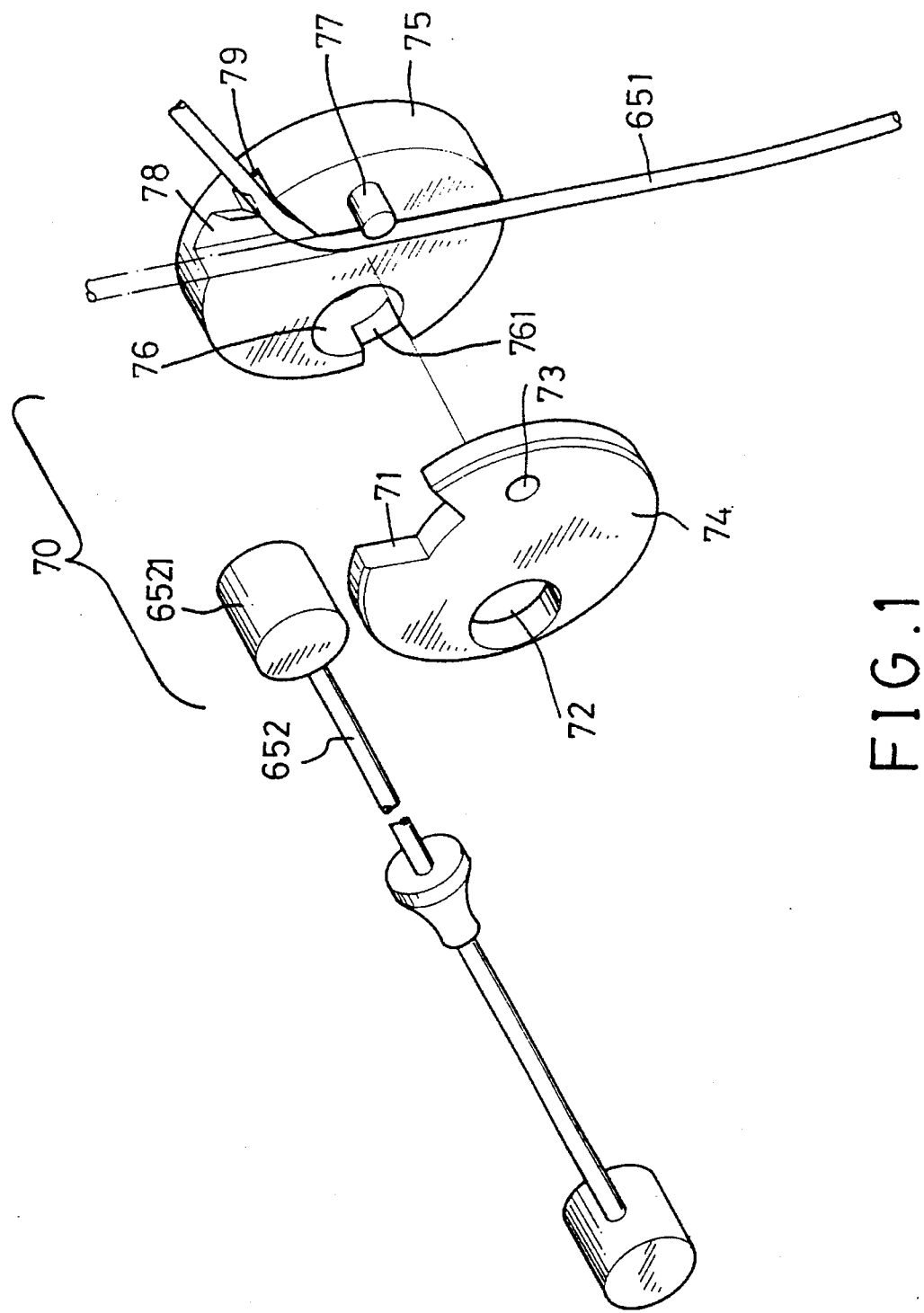
FIG. 1 is an exploded view of a conventional connector and two brake cables connected thereto.
Figure 3:
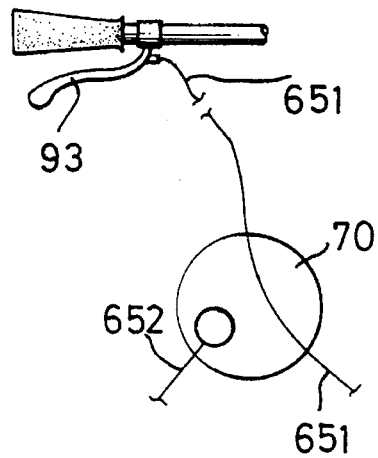
FIG. 3 is an illustrative view of the conventional and two brake cable disposed thereto.
Figure 2:
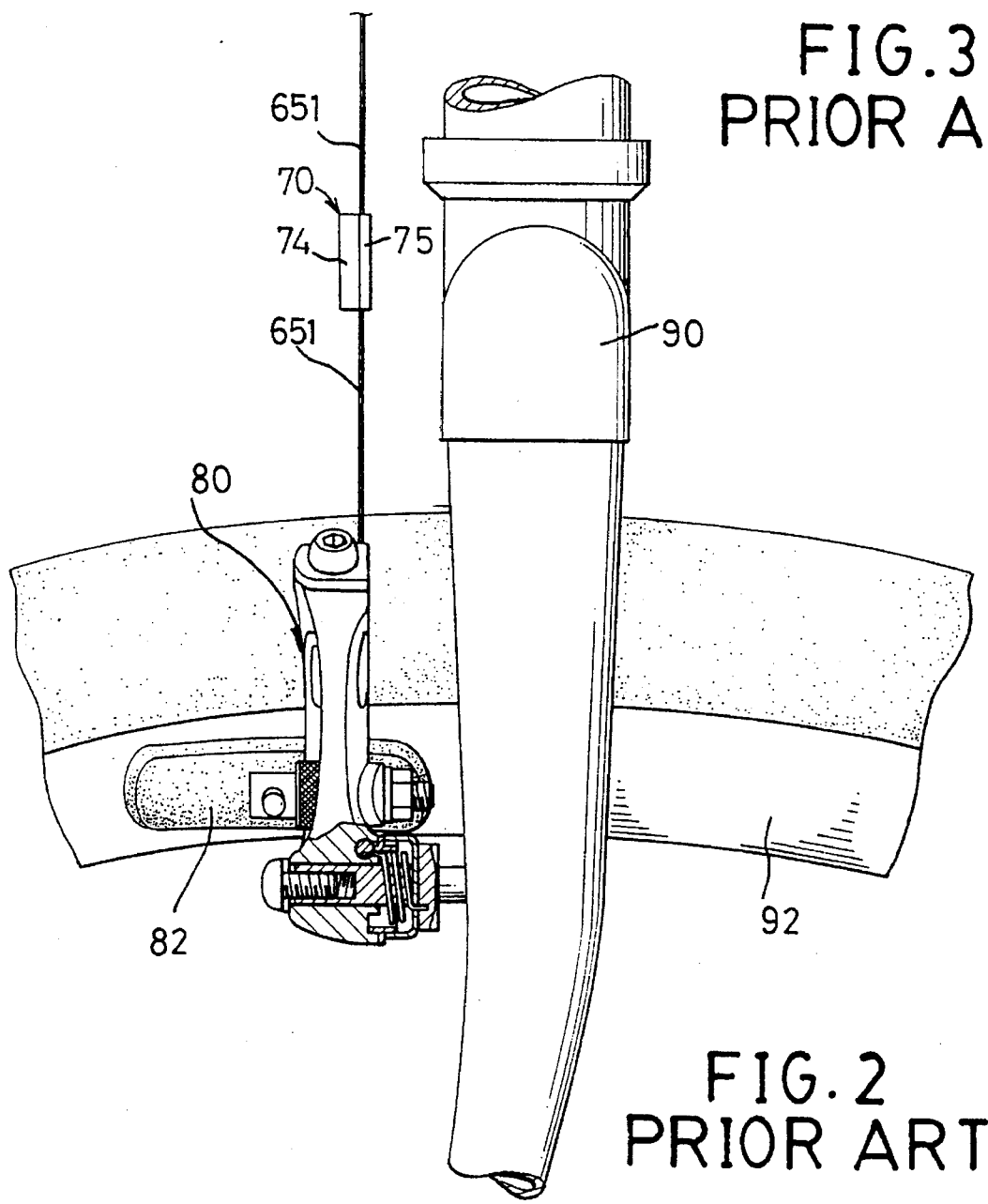
FIG. 2 is a side elevational view, partly in section, of the conventional connector disposed to a brake assembly disposed to a front fork.
Figure 4:
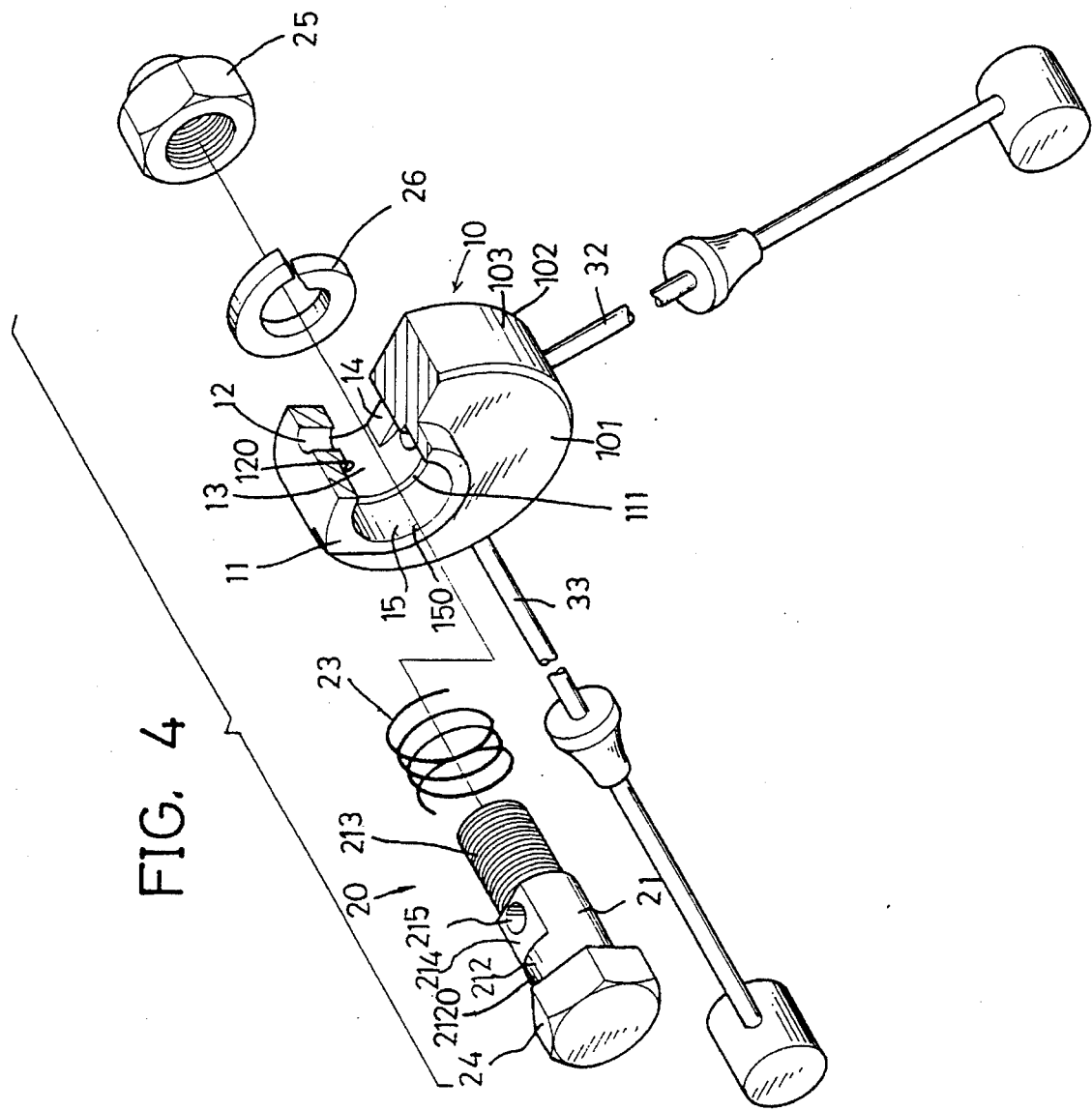
FIG. 4 is an exploded view of a connector and a bolt in accordance with the present invention.

Referring to the drawings and initially to FIG. 4, a connector 10 in accordance with the present invention is a circular body which has a first side 101 and a second side 102, a first brake cable 32 and a second brake cable 33 extending integrally, inclinedly and downwardly from a periphery 103 of the connector 10, a tubular portion 11 extending transversely from the first side 101 of the connector 10, a bore 13 defined in the connector 10 above the first and second brake cables 32, 33 and communicating with a counter-bore 15 defined within the tubular portion 11, and a first hole 12 defined in the connector 10 and being perpendicular to and communicating with the bore 13 and extending between the first and second brake cables 32, 33. A shoulder 111 is formed between a first periphery 130 defining the bore 13 and a second periphery 150 defining the counter-bore 15. Two flats 14 are formed diametrically opposite on the first periphery 130 defining the bore 13, at an end opposite to the shoulder 111. A bolt 20 for extending through the bore 13 and counter-bore 15 has a head 24 and a shank 21, the shank 21 has a first portion 212 integrally formed with the head 24 and a second portion 213 separated from the head 24 by the first portion 212. Two flats 214 corresponding to the flats 14 of the bore 13 are defined diametrically opposite on a periphery 2120 of the first portion 212. A second hole 215 is transversely defined through the first portion 212 in communication with the flats 214. A thread is formed on the second portion 213 of the bolt 20.

Figure 6:
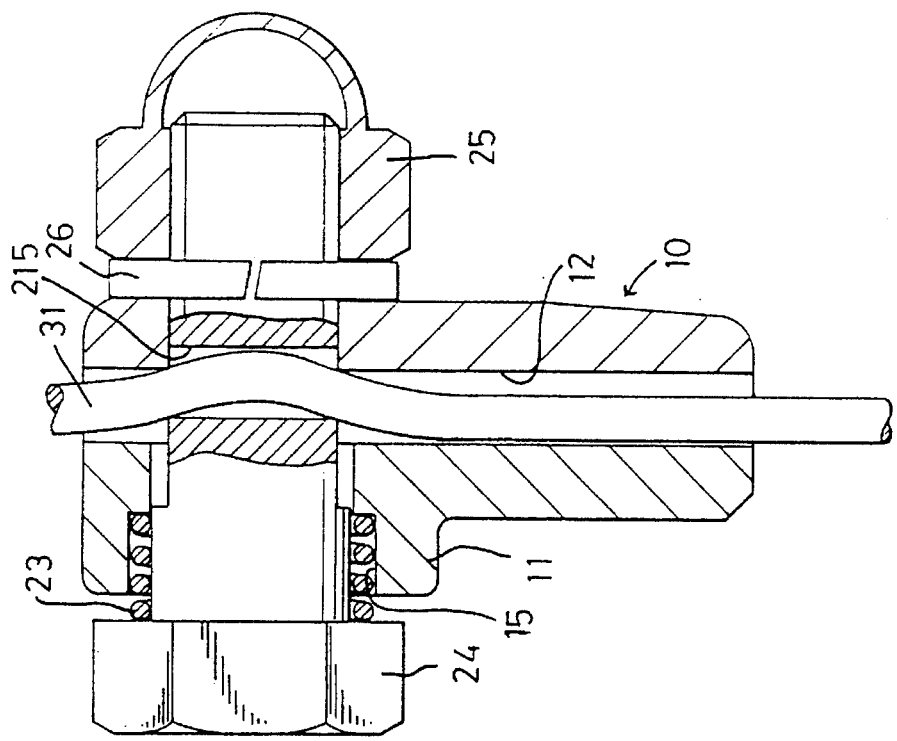
FIG. 6 is a side elevational view, partly in section, of the connector and a bolt through which a third brake cable extends in accordance with the present invention.
Figure 5:
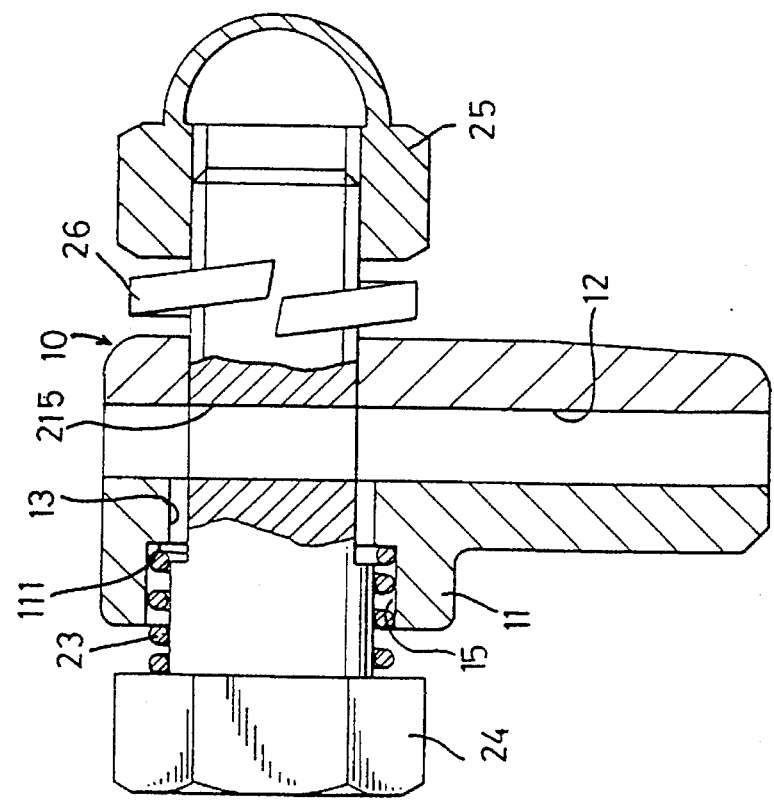
FIG. 5 is a side elevational view, partly in section, of the connector and a bolt in accordance with the present invention.
Figure 7:
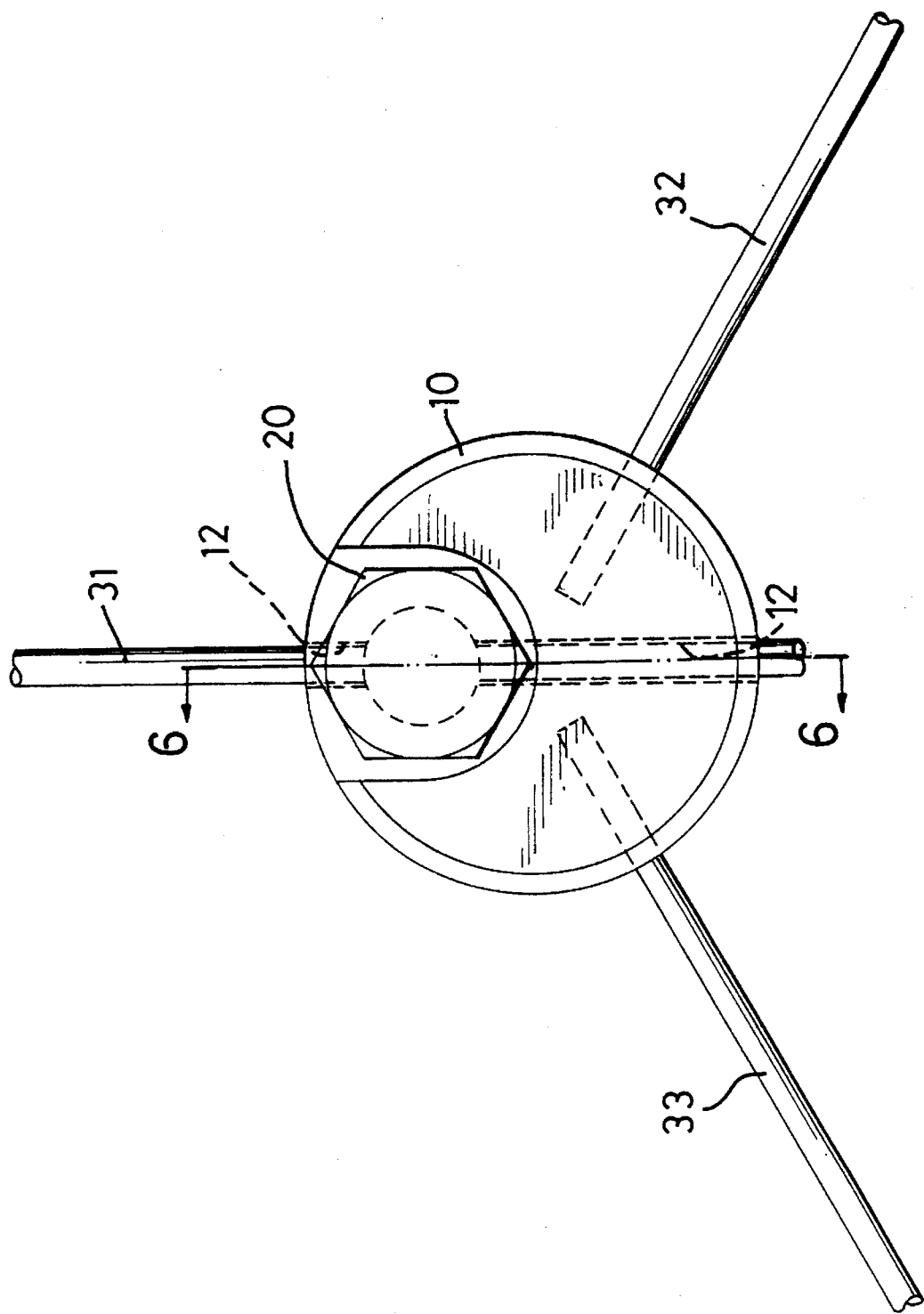
FIG. 7 is an illustrative view of the connector and three brake cables.
Figure 8:
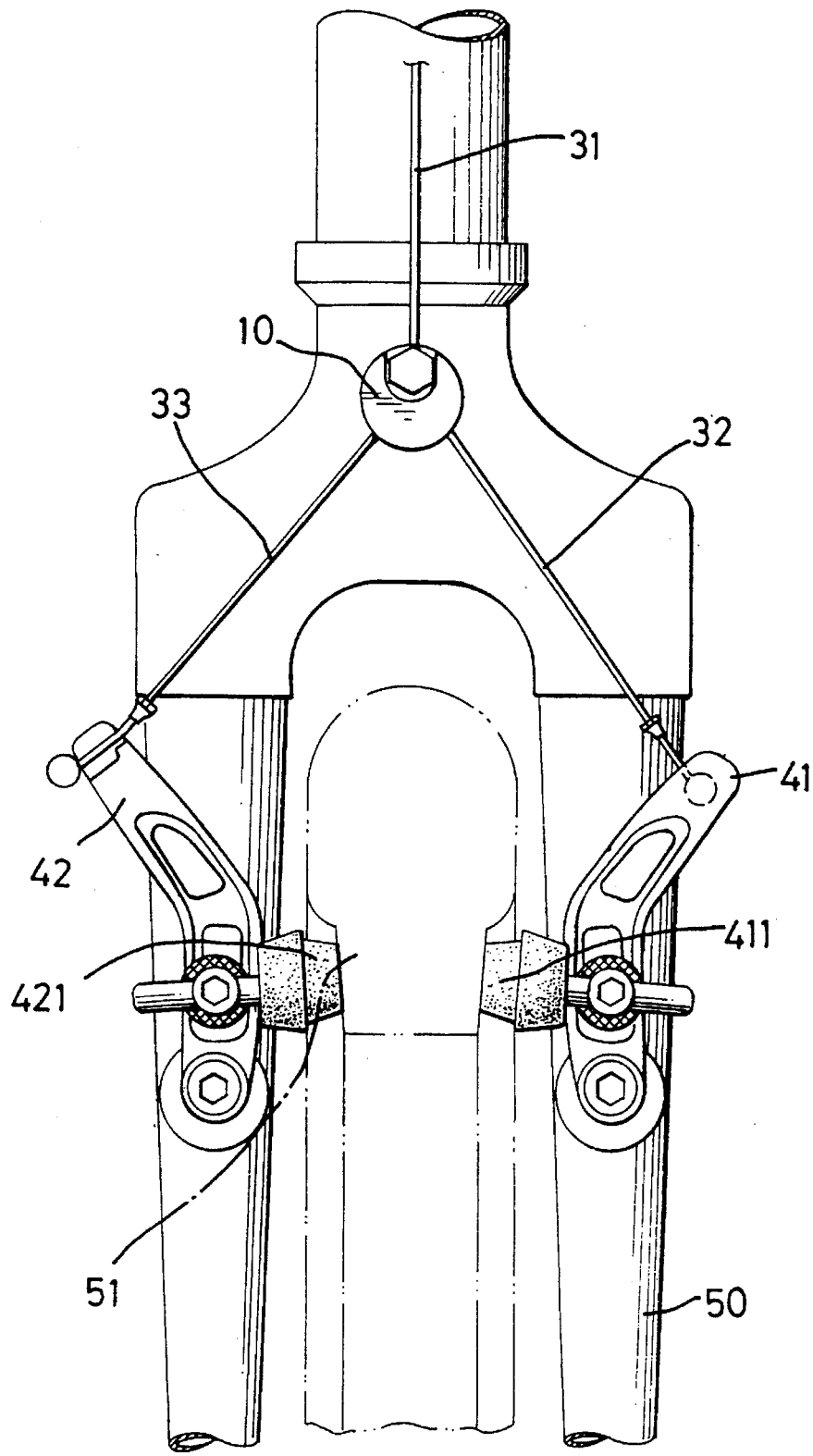
FIG.8 is a front elevational view of the connector and a brake assembly disposed to a front fork of a bicycle.

Referring to FIG. 8, the first brake cable 32 and the second brake cable 33 are respectively connected to a corresponding brake arm 41, 42 thereof each of which is pivotally engaged to a front fork 50 of a bicycle (not shown) so as to stop a wheel rim 51 by friction between brake blocks 411, 421 connected to the brake arms 41, 42 and the wheel rim 51. Referring to FIGS. 5, 6 and 7, a third brake cable 31 has a first end connected to a brake lever (not shown) and a second end thereof extending through the second hole 215 of the bolt 20 and the first hole 12 of the connector 10. The bolt 20 extends through a spring 23, the counter-bore 15, the bore 13 and a washer 26 to threadedly engage to a nut 25 such that the spring 23 is disposed between the head 24 of the bolt 20 and the shoulder 111 and, thus the third cable 31 is fixedly engaged in the connector 10.

Please refer to FIG. 7 which shows an included angle between the first brake cable 32 and the third brake cable 31 is equal to that between the second brake cable 33 and the third brake cable 31 such that when the third brake cable 31 is pulled upwardly it will exert an equal force to each of the first brake cable 32 and the second brake cable 33. Furthermore, if an adjustment is required to adjust a distance between the first and the second brake cables 32, 33 and the wheel rim 51, an operator simply unscrews the bolt 20 and pulls up (or pushes down) the third brake cable 31 to maintain a suitable position of the connector 10.

Although the invention has been explained in relation to its preferred embodiment, it is to be understood that many other possible modifications and variations can be made without departing from the spirit and scope of the invention as hereinafter claimed.

I claim:

1. A connector for engaging brake cables, said connector having a first side and a second side, a bore defined therein, said first side thereof having a tubular portion extending therefrom defining a counter-bore in communication with said bore, a first hole defined in said connector and communicating with said bore;

a first brake cable and a second brake cable respectively extending from a periphery of said connector and said first hole extending between said first brake cable and said second brake cable; and a bolt positioned in said bore and having a head and a shank, said shank having a first portion and a second portion, said first portion having a second hole transversely defined therein for a third brake cable to extend in said first and second hales said second portion having a thread formed therearound for engagement with a nut.

2. The connector as claimed in claim 1 wherein a shoulder is formed between a first periphery defining said bore and a second periphery defining said counter-bore and, said bolt extends through a spring which is disposed between said shoulder and said head of said bolt in said tubular portion.

3. The connector as claimed in claim 1 wherein a washer for said bolt extending therethrough is disposed between said connector and said nut.

4. The connector as claimed in claim 1 wherein said first brake cable and said third brake cable have an included angle equal to that between said second brake cable and said third brake cable.

5. The connector as claimed in claim 1 wherein said counter-bore has two diametrically opposite flats formed therein and said bolt has two correspondingly formed flats thereon.

* * * * *